A. BROWN.

Heating-Stoves.

No. 5,998. Reissued Aug. 4, 1874.

Witnesses.

A. H. Norris

W. J. Peyton

Inventor

Albert Brown

By James L. Norris.

Atty.

THE GRAPHIC CO. PHOTO-LITH. 39 & 41 PARK PLACE, N.Y.

UNITED STATES PATENT OFFICE.

ALBERT BROWN, OF TROY, NEW YORK, ASSIGNOR, BY MESNE ASSIGNMENTS, TO DANIEL E. PARIS AND SWETT, QUIMBY & PERRY, OF SAME PLACE.

IMPROVEMENT IN HEATING-STOVES.

Specification forming part of Letters Patent No. 64,943, dated May 21, 1867; reissue No. 5,998, dated August 4, 1874; application filed April 30, 1874.

*To all whom it may concern:*

Be it known that I, ALBERT BROWN, of Troy, in the county of Rensselaer and State of New York, have invented a new and useful Improvement in Stoves; and I do hereby declare that the following is a full, clear, and exact description thereof, reference being had to the accompanying drawings, and to the letters of reference marked thereon, forming a part of this specification, in which—

Figure 1:
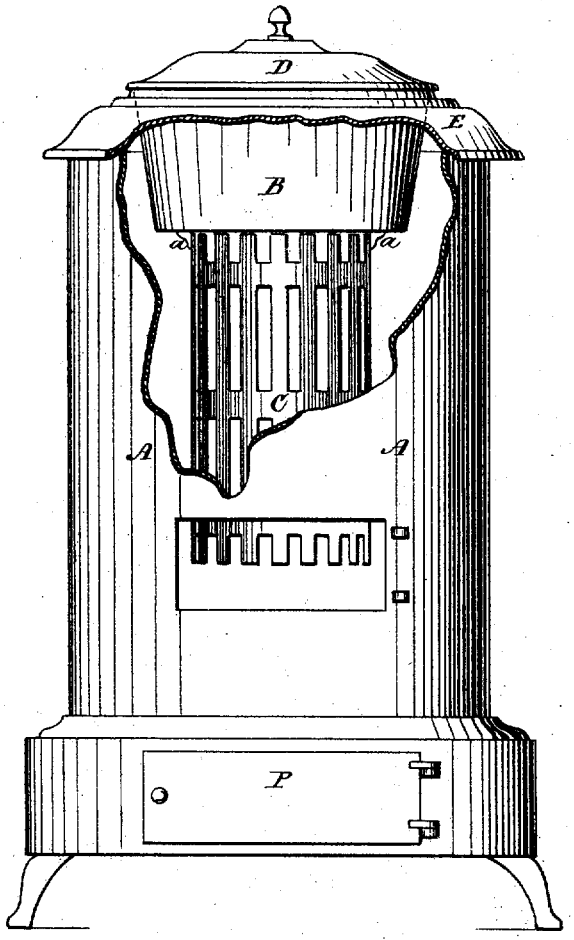
Figure 2:
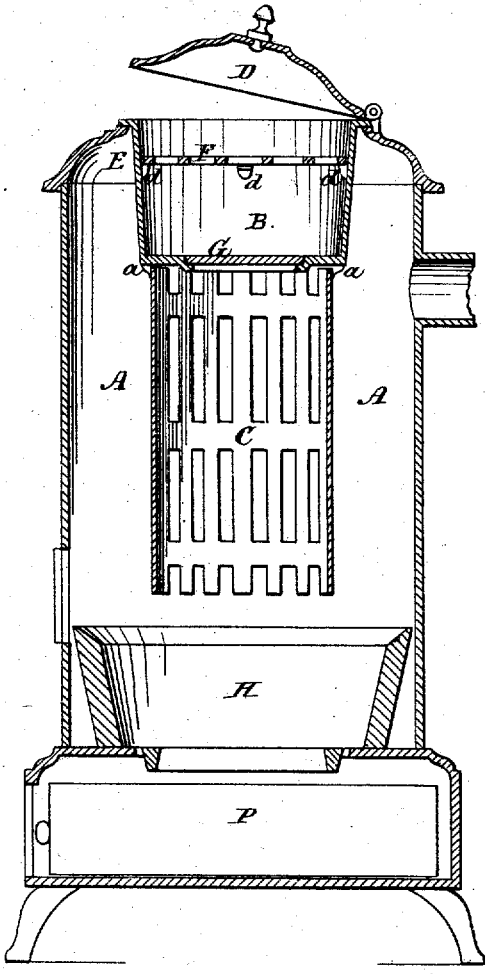

Figure 1 is a front elevation of a stove illustrating my invention as applied thereto, and Fig. 2 is a vertical section of the same.

The same letters refer to like parts in each of said figures.

This invention consists in interposing a base-burning fuel-reservoir or fuel-supplying chamber within a stove between an oven and a fire-pot in such a manner that the mouth of the reservoir will be in close proximity, but out of contact with the fire-pot, whereby is combined in a stove conveniences of a reservoir or a supply-chamber for receiving, holding, and conducting fuel to the fire-pot, with an oven for cooking, baking, or heating purposes. The invention also consists in combining an oven and a base-burning fuel-reservoir or fuel-supply chamber with a stove having a fire-pot, said oven and reservoir being suspended within the stove in such a manner as to be removed and replaced when desired to use the stove without the reservoir and oven, or should they become injured by the action of the fire. The invention also consists in providing the bottom of the oven of a stove with an opening or aperture to receive a boiler, such constructed oven being combined with a suspended open-mouthed fuel-supplying reservoir intervening between a removable oven and the fire-pot.

To enable others skilled in the art to make and use my said invention and improvement, I will now proceed to fully describe its construction.

A A, Figs. 1 and 2, represent the external or outside walls of a heating-stove, which is provided with a fire-pot, H, and ash-pit, P, of the usual manner of construction. In the top plate E of such a stove is made an opening or aperture, within which, and supported in its position by a flange at its upper part, which rests upon the top edge of said opening, is placed an oven, B. This oven projects its whole depth or thereabouts down into the combustion or flame chamber of the stove. It may be covered by a hinged lid, D, or by a removable cover. The oven is likewise provided with a perforated or slotted rack, F, resting upon lugs *d d* formed or placed upon its interior. This rack is for the purpose of supporting articles upon to be baked or cooked. In the bottom plate of this oven is made an aperture, G, through which fuel may be introduced into a fuel-reservoir or fuel-supplying chamber. This feed-aperture serves also for a boiler-hole, within which may be placed a vessel for the purpose of heating or boiling its contents. When not in use said feed-aperture and boiler-hole is covered by a lid.

Attached directly to and under the bottom of aforesaid oven is a base-burning fuel-reservoir or supply-chamber, C, it being secured thereto by means of lugs and bolts *a*, or in any other suitable manner; or it may be supported therein by the lugs or arms projecting from said fuel-reservoir being attached to said oven or to the side walls of the stove. Various other modifications of construction and arrangement may be made, provided the essential features of my invention, as herein set forth, are retained. Thus, by my invention, there is combined in one stove the conveniences of a fuel-reservoir and of an oven, thereby rendering it convenient to cook by, and a with fuel-reservoir heating-stove, making of it an improved and more useful article of household comfort than heretofore, and without impairing its efficiency as a heating-stove. The fuel-reservoir, thus located under the oven and above the fire-pot, may be easily and conveniently replenished with fuel, and such fuel will be held, and gradually fed or supplied to the fire-pot as it is consumed therein.

It will be seen that the fuel-reservoir C is supported by the oven, and hangs suspended therefrom, so that the flame of combustion shall have an open space in order to burn freely unobstructed by the feeder itself. Therefore any support or stay to the feeder at or near its lower part would not only quickly burn out, but would obstruct (more or less) the free burning of the fuel. It is therefore important that the fuel-reservoir be supported from above; and, if an oven is formed at or near the top of the stove, it is important that it be supported from the oven, and especially so if an aperture be made in the oven to supply the reservoir with fuel.

It will be seen by Fig. 1 that the fuel-reservoir does not cover the whole bottom of the oven, but leaves exposed a part of the bottom of it to the action of the heat below. This is important, so that the oven may thus be thoroughly heated. It will be seen that the sides of the oven are also exposed to the heat.

The bottom of the oven is apt to get too hot, and thus a fuel-reservoir suspended from it, or intervening between it and the fire-pot, is, besides being useful as a fuel-reservoir, also beneficial to the oven in shielding it from the intense heat from the fire-pot below, and so that a portion of the oven-bottom be left exposed it will receive sufficient heat for all the purposes for which it is used.

Ovens over the fire-pot, and heated on the bottom, sides, and top, are very old; but the interposition of a fuel-reservoir between it and the fire-pot (the oven and fire-pot being independent of each other) is believed to be a new invention. It will be seen that the fire-pot is also independent of the reservoir, and, if the reservoir be taken away entirely, the stove will then become the old construction with a fire-pot and oven over it, supported by the outside shell of the stove. This invention, then, consists of simply intervening or interposing between the usual oven and the usual fire-pot a fuel-reservoir made for the double purpose of supplying the fire-pot with fuel and for shielding the bottom of the oven from the intense heat of the fire-pot. It will be seen, also, that the exit-pipe is placed to the rear of the stove, and not on its top. It is important that the top of the stove be left unobstructed, so that vessels may be set thereon, and for other purposes.

The oven and the reservoir are so combined and connected together and to the stove that they can readily be removed should it be desired at any time to use the stove as an ordinary stove, without the oven or reservoir; and, further, should the oven or reservoir (either or both) become injured or impaired by the action of the heat or flame, the same can be removed with comparative ease and facility, and new ones substituted.

What I claim as new, and desire to secure by Letters Patent, is—

1. In combination with the combustion-chamber of a base-burning stove, of a fuel-reservoir or supply-chamber located directly under an oven depending within the stove, substantially as described.

2. The combination of a fuel-reservoir or fuel-supplying chamber with the combustion-chamber of a base-burning stove, its fire-pot, and an oven suspended from the top of the stove in direct communication with the combustion-chamber.

3. The combination of an oven and a fuel-reservoir or fuel-supplying chamber with the combustion-chamber of a base-burning stove and its fire-pot, the fuel-reservoir or fuel-supplying chamber being removable and suspended within the stove in direct contact with the products of combustion.

4. A removable oven of a heater or stove, provided with an opening or aperture to receive a boiler, in combination with a suspended open-mouthed fuel-supplying reservoir intervening between the oven and the fire-pot.

In testimony whereof I have hereunto set my hand this 22d day of April, A. D. 1874.

ALBERT BROWN.

Witnesses:
ROBT. H. MCCLELLAN,
GEORGE SCOTT.